(12) United States Patent
Nishio et al.

(10) Patent No.: US 7,188,148 B2
(45) Date of Patent: Mar. 6, 2007

(54) INFORMATION PROVIDING APPARATUS, INFORMATION PROVIDING METHOD, DELIVERING APPARATUS, AND DELIVERING METHOD

(75) Inventors: Fumihiko Nishio, Tokyo (JP); Yoshihisa Gonno, Kanagawa (JP); Tomohiro Tsunoda, Tokyo (JP); Yasuaki Yamagishi, Kanagawa (JP)

(73) Assignee: Sony Corporation (JP)

( * ) Notice: Subject to any disclaimer, the term of this patent is extended or adjusted under 35 U.S.C. 154(b) by 622 days.

(21) Appl. No.: 09/826,109

(22) Filed: Apr. 4, 2001

(65) Prior Publication Data

US 2002/0059573 A1 May 16, 2002

(30) Foreign Application Priority Data

Apr. 7, 2000 (JP) ............................ P2000-107202

(51) Int. Cl.
*G06F 15/16* (2006.01)
*G06F 15/177* (2006.01)
*G06F 15/173* (2006.01)
*G06F 11/30* (2006.01)
*H04Q 7/24* (2006.01)

(52) U.S. Cl. ............... 709/217; 709/203; 709/219; 709/222; 709/226; 713/193; 370/338

(58) Field of Classification Search .......... 709/203, 709/217
See application file for complete search history.

(56) References Cited

U.S. PATENT DOCUMENTS

| | | | | |
|---|---|---|---|---|
| 6,219,700 | B1* | 4/2001 | Chang et al. | 709/222 |
| 6,330,603 | B1* | 12/2001 | Seki et al. | 709/226 |
| 6,405,239 | B1* | 6/2002 | Addington et al. | 709/203 |
| 6,446,108 | B1* | 9/2002 | Rosenberg et al. | 709/203 |
| 6,487,663 | B1* | 11/2002 | Jaisimha et al. | 713/193 |
| 6,512,754 | B2* | 1/2003 | Feder et al. | 370/338 |
| 6,625,643 | B1* | 9/2003 | Colby et al. | 709/217 |
| 2001/0003828 | A1* | 6/2001 | Peterson et al. | 709/219 |

* cited by examiner

Primary Examiner—Bunjob Jaroenchonwanit
Assistant Examiner—Philip Lee
(74) Attorney, Agent, or Firm—Lerner, David, Littenberg, Krumholz & Mentlik, LLP (57) ABSTRACT

An information providing apparatus for registering the delivery of content data including a storing section for storing content that is provided and a delivery designating section for designating a delivery condition for delivering the content, wherein a delivering apparatus presents data necessary for determining the delivery condition that is designated by the delivery designating section.

7 Claims, 6 Drawing Sheets

INFORMATION PROVIDING APPARATUS, INFORMATION PROVIDING METHOD, DELIVERING APPARATUS, AND DELIVERING METHOD

BACKGROUND OF THE INVENTION

1. Field of the Invention

The present invention relates to an information providing apparatus, an information providing method, a delivering apparatus, and a delivering method for delivering content data.

2. Description of the Related Art

In the conventional CS (Communication Satellite) digital broadcast corresponding to the MPEG2 (Moving Picture Experts Group Phase 2) system, bands (channels) assigned to individual contents are pre-designated. A content provider creates a transmission schedule for a content with a pre-designated band and provides the content under the total control of a broadcasting station as a delivering device for each channel. As the number of channels of the digital broadcast increases, the number of content providers increases. In addition, the provided contents are diversified and the content providers are distributed.

Thus, conventionally, bands, broadcast time, and so forth assigned to contents are totally managed. Thus, a content provider can not select a transmission band, transmission time, and a transmission path by his or her preference. For example, when a content provider transmits a content through a particular channel, he or she should request the broadcasting station that manages the channel to reserve designated transmission band and time for the content.

In the environment that the number of content providers increases and they are distributed, when the broadcasting station side totally manages transmission bands and transmission time for contents, the flexibility of transmission bands and transmission time for contents is lost. A content provider may want to deliver a content with his or her convenient band and time from view points of the provided content, expected number of audiences, the cost, and so forth. However, the conventional content delivering system cannot satisfy the needs of content providers.

Thus, it is preferred to allow a content provider to easily designate a delivery condition. However, since a delivery condition cannot be exclusively designated, the operation for designating the delivery condition may become complicated. In addition, the delivery condition cannot be effectively designated.

OBJECTS AND SUMMARY OF THE INVENTION

Therefore, an object of the present invention is to provide an information providing apparatus, an information providing method, a delivering apparatus, and a delivering method that allow an information provider to easily designate a proper delivery condition in an information delivering system that delivers content data.

A first aspect of the present invention is an information providing apparatus for registering the delivery of data for providing a content, comprising a storing means for storing a content that is provided, and a delivery designating means for designating a delivery condition for delivering a content, wherein a delivering apparatus-presents data necessary for considering the delivery condition that is designated to said delivery designating means.

A second aspect of the present invention is an information providing method for registering the delivery of data for providing a content, comprising the steps of storing a content that is provided, and designating a delivery condition for delivering a content, wherein before the delivery condition is designated, a delivering apparatus presents data necessary for considering the delivery condition that is designated.

A third aspect of the present invention is a delivering apparatus for delivering data for providing a content, comprising a first communicating means for receiving a content that is provided from an information provider, a storing means for storing a content, a transmitting means for delivering a content to a receiving terminal unit, a second communicating means for receiving user profile information from a receiving terminal unit, a profile storing means for storing the profile information, a charging process controlling means for calculating a cost necessary for delivering a content, and a band controlling means for controlling a band used for delivering a content, wherein said charging process controlling means pre-calculates the number of audiences for a content corresponding to the profile information, calculates a cost necessary for delivering the content, and informs an information providing apparatus of the cost.

A fourth aspect of the present invention is a delivering apparatus for delivering data for providing a content, comprising a first communicating means for receiving a content that is provided from an information provider, a storing means for storing a content, a transmitting means for delivering a content to a receiving terminal unit, a second communicating means for receiving user watching/listening history from a receiving terminal unit, a watching/listening history storing means for storing the watching/listening history, a charging process controlling means for calculating a cost necessary for delivering a content, and a band controlling means for controlling a band of a network used for delivering a content, wherein said charging process controlling means pre-calculates the number of audiences for a content corresponding to the watching/listening history, calculates a cost necessary for delivering the content, and informs an information providing apparatus of the cost.

A fifth aspect of the present invention is a delivering method for delivering data for providing a content, comprising the steps of receiving a content that is provided from an information provider, storing a content, delivering a content to a receiving terminal unit, receiving user profile information from a receiving terminal unit, storing the profile information, calculating a cost necessary for delivering a content, and controlling a band used for delivering a content, wherein the number of audiences for a content is pre-calculated corresponding to the profile information, wherein a cost necessary for delivering the content is calculated, and wherein an information providing apparatus is informed of the cost.

A sixth aspect of the present invention is a delivering method for delivering data for providing a content, comprising the steps of receiving a content that is provided from an information provider, storing a content, delivering a content to a receiving terminal unit, receiving user watching/listening history from a receiving terminal unit, storing the watching/listening history, calculating a cost necessary for delivering a content, and controlling a band of a network used for delivering a content, wherein the number of audiences for a content is pre-calculated corresponding to the watching/listening history, wherein a cost necessary for delivering the content is calculated, and wherein an information providing apparatus is informed of the cost.

According to the present invention, the information providing apparatus can easily designate a delivery condition of a content.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
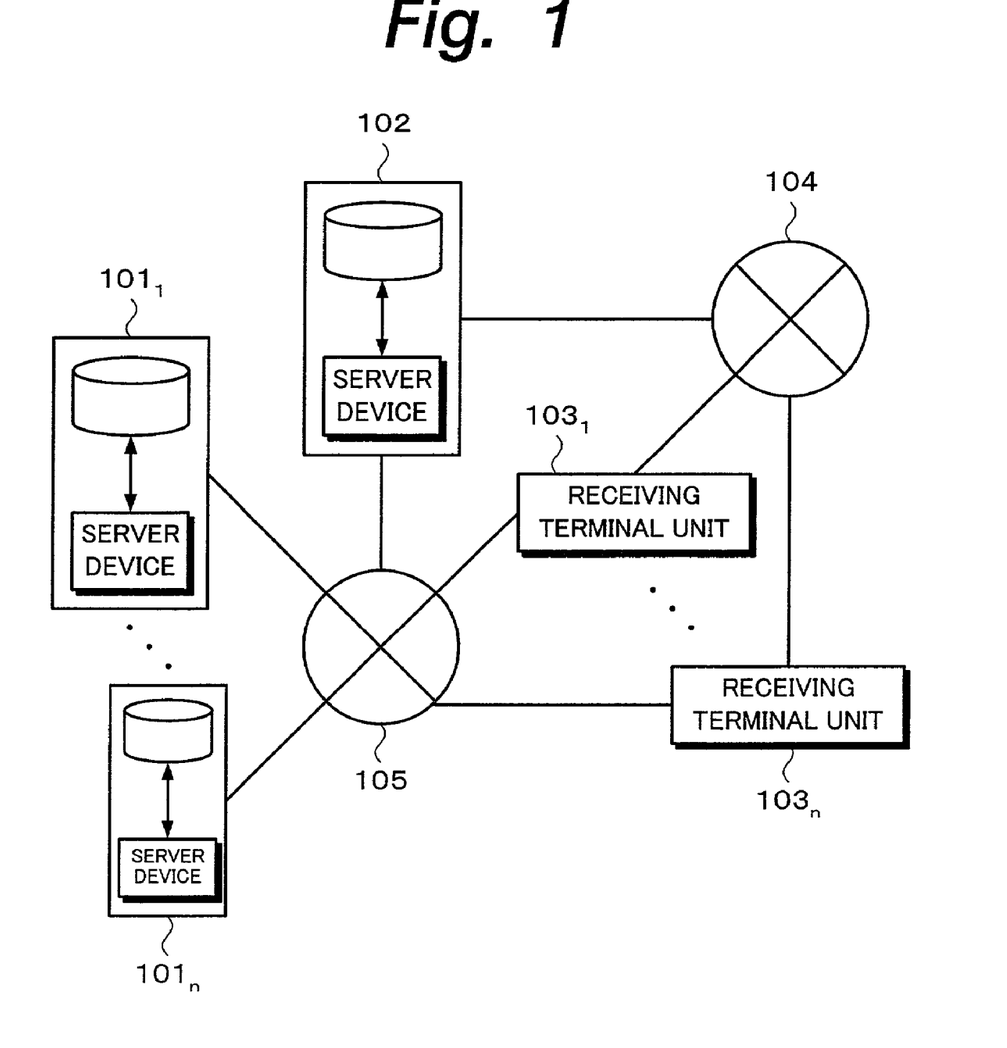
FIG. 1 is a schematic diagram showing an example of an information providing system according to the present invention.

FIG. 1 shows the overall structure of an embodiment of the present invention. Referring to FIG. 1, each of information providing apparatuses $101_1$, ..., and $101_n$ pin has a data storing portion (for example, a hard disk) and a server. The information providing apparatuses $101_1$, ..., and $101_n$ provide content data to a delivering apparatus 102 through a bi-directional network 105. The delivering apparatus 102 has a server and a storing portion (for example, a hard disk). The delivering apparatus 102 delivers data to receiving terminal units $103_1$, ..., and $103_n$ through a data multicast network 104 (for example, a digital broadcast). In addition, the delivering apparatus 102 not only manages the delivery of content data, but performs managing operations such as a user information managing operation and a charging managing operation.

In addition, data can be delivered to the receiving terminal units $103_1$, ..., and $103_n$ through the bi-directional network 105 (for example, the Internet). The receiving terminal units $103_1$, ..., and $103_n$ are owned by individual users. Each of the receiving terminal units $103_1$, ..., and $103_n$ has a displaying portion (for example, an LCD (Liquid Crystal Display)) that displays delivered content data for each user. In addition, the receiving terminal units $103_1$, ..., and $103_n$ selectively receive delivered contents corresponding to their profile information. Moreover, the receiving terminal units $103_1$, ..., and $103_n$ transmit profile information and content watching/listening history information to the delivering apparatus 102 through the bi-directional network 105.

Figure 2:
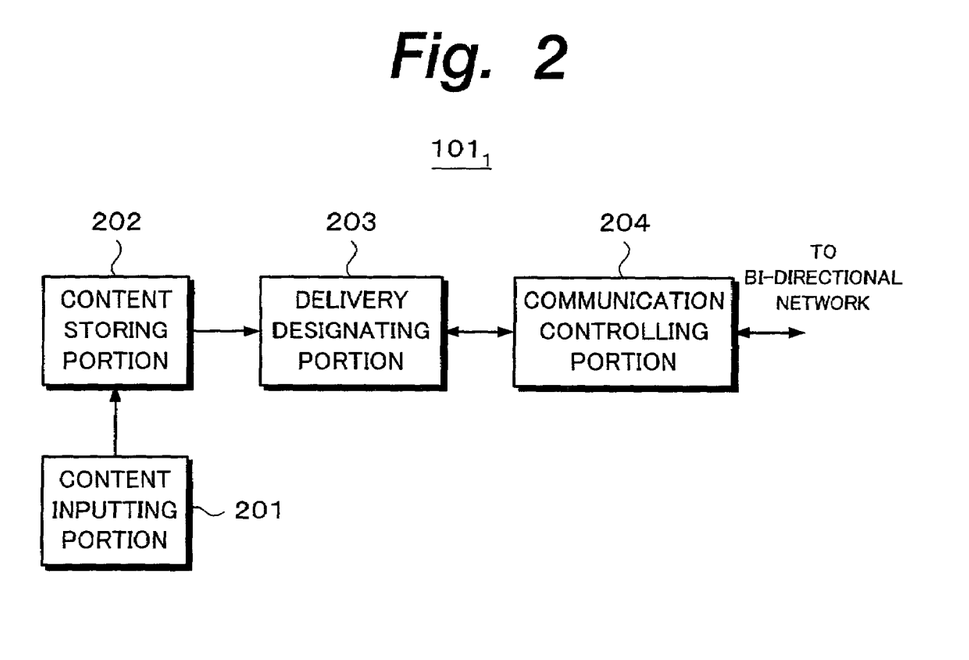
FIG. 2 is a block diagram showing an example of the structure of an information providing apparatus according to an embodiment of the present invention.

FIG. 2 shows an example of the structure of the information providing apparatus $101_1$. Content data is input through a content inputting portion 201. A content storing portion 202 stores a content that is provided. A delivery designating portion 203 designates a delivery condition for a content (an example of the delivery condition is a band used for delivering a content). In this case, the delivery designating portion 203 can designate a delivery condition to each of the multicast network 104 and the bi-directional network 105. In other words, the delivery designating portion 203 can designate a medium used for delivering a content (examples of the medium are a satellite broadcast and an Internet television).

The delivery designating portion 203 designates a delivery condition for a content by (interactively) exchanging the delivery condition with an content inputting portion of the delivering apparatus 102 through a communication controlling portion 204 and the bi-directional network 105. After a delivery condition for a content has been designated, the content that is delivered is sent to the delivering apparatus 102 through the communication controlling portion 204 and the bi-directional network 105. The structure of each of the information providing apparatuses $101_2$ to $101_n$ may be the same as the structure of the information providing apparatus $101_1$.

Figure 3:
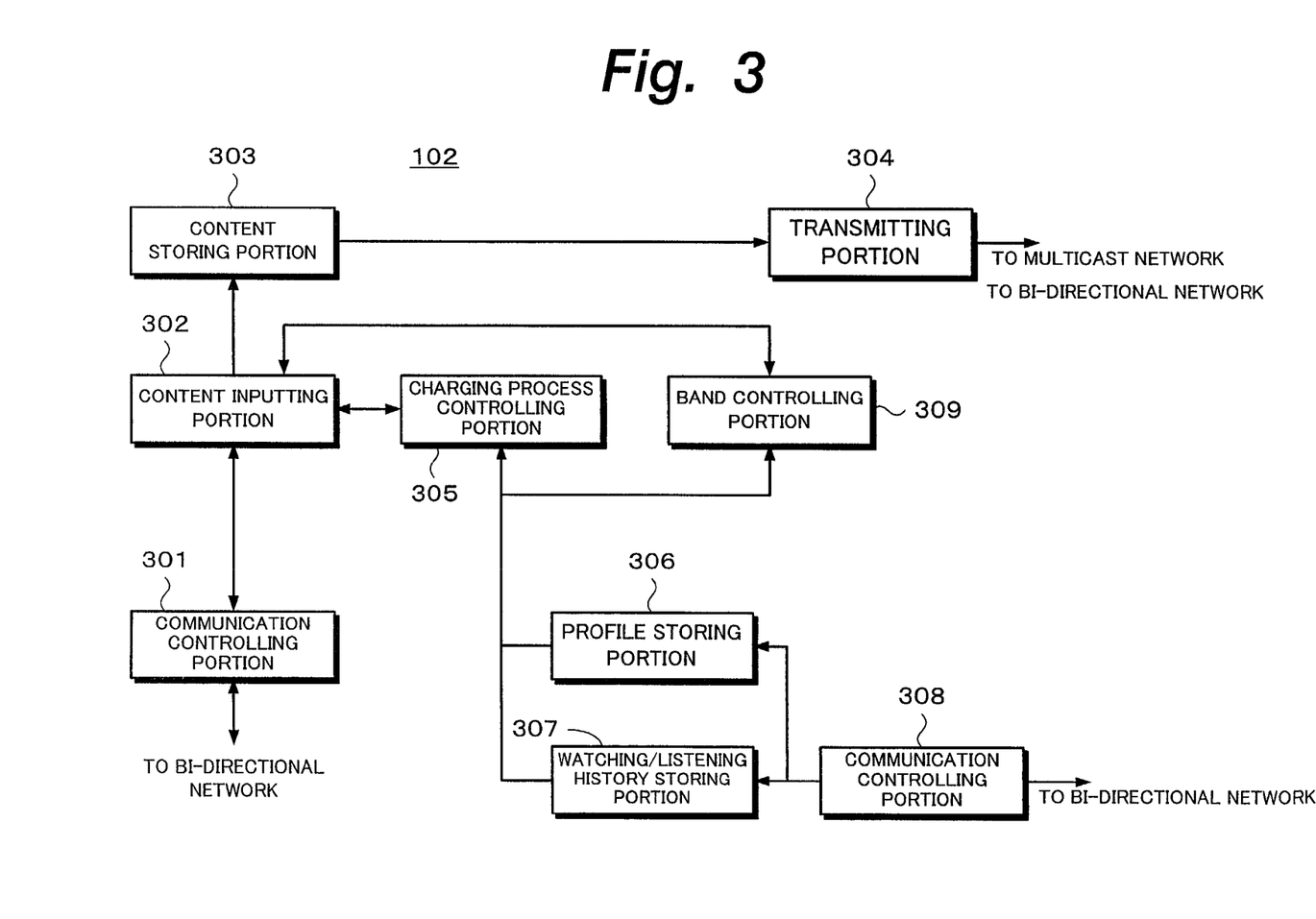
FIG. 3 is a block diagram showing an example of the structure of a delivering apparatus according to the embodiment of the present invention.

FIG. 3 shows an example of the structure of the delivering apparatus 102. A communication controlling portion 301 collects content data transmitted from the information providing apparatuses $101_1$, ..., and $101_n$. The communication controlling portion 301 supplies the received content data to a content inputting portion 302. The content inputting portion 302 supplies the supplied content data to a content storing portion 303. The content storing portion 303 stores content data that is delivered.

When the content inputting portion 302 collects contents that are delivered from the information providing apparatuses $101_1$, ..., and $101_n$, the content inputting portion 302 (interactively) exchanges charging information with the information providing apparatuses $101_1$, ..., and $101_n$. At that point, a charging process controlling portion 305 controls a charging process. The charging process controlling portion 305 performs the charging process corresponding to user profile information and real content watching/listening history.

A band controlling portion 309 is disposed in association with the content inputting portion 302. The band controlling portion 309 controls a band as a delivery condition. The band controlling portion 309 performs the process corresponding to user profile information and real content watching/listening history. When receiving terminal units $103_1$, ..., and $103_n$ can store received a content, the delivering apparatus 102 can deliver the content in a network non-busy time rather than real time. In this case, the band controlling portion 309 controls the assignment of a band for the content. When it is expected that many users (owners of receiving terminal units) want to watch a content that is delivered, the band controlling portion 309 assigns a wide band for the content so that it can be delivered in a short time. In contrast, when it is expected that not many users want to watch the content that is delivered, the band controlling portion 309 assigns a narrow band for the content so that it is delivered with the narrow band in a long time. The band controlling portion 309 performs such a band controlling operation.

User profile information and real content watching/listening history are stored to a profile storing portion 306 and a watching/listening history storing portion 307, respectively. User profile information and watching/listening history are periodically or non-periodically collected from the receiving terminal units $103_1$, ..., and $103_n$ through a communication controlling portion 308. After a delivery condition of a content has been designated, the content is stored to the content storing portion 303. A content stored in the content storing portion 303 is delivered from a transmitting portion 304 to the receiving terminal units $103_1$, ..., and $103_n$ through the multicast network 104 or the bi-directional network 105.

Figure 4:
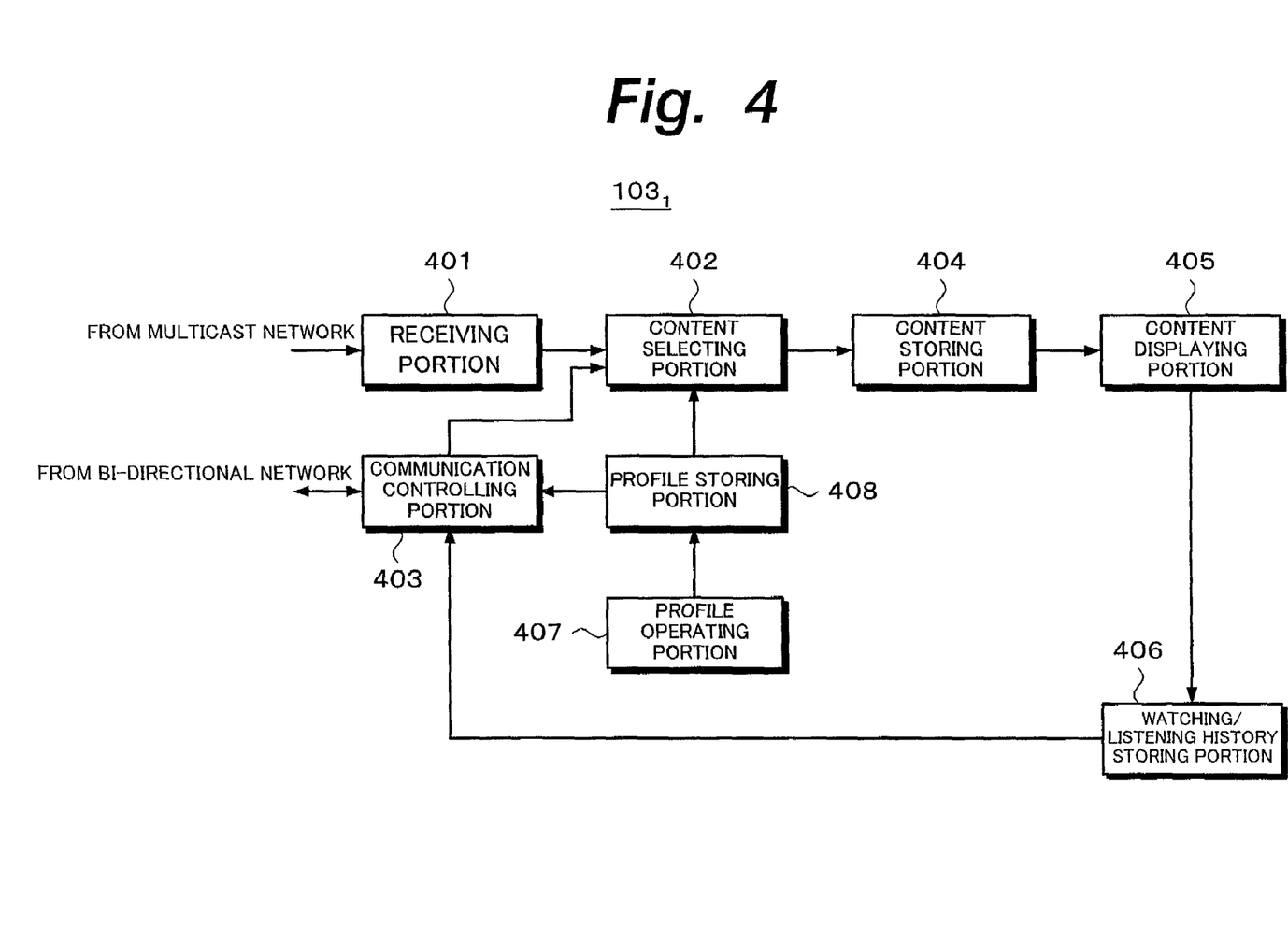
FIG. 4 is a block diagram showing an example of the structure of a receiving terminal unit of the delivering apparatus according to the embodiment of the present invention.

FIG. 4 shows an example of the structure of the receiving terminal unit $103_1$. A receiving portion 401 receives content data from the multicast network 104 and supplies the received content data to a content selecting portion 402. A communication controlling portion 403 receives content data from the bi-directional network 105 and supplies the received content data to the content selecting portion 402. In addition, the communication controlling portion 403 transmits user profile information and real content watching/listening history to a transmitting device through the bi-directional network 105.

The content selecting portion 402 selects data (that is stored) from the supplied data and supplies the selected data to a content storing portion 404. The content storing portion 404 stores the selected data. A content that is read from the content storing portion 404 is displayed by a content displaying portion 405. A watching/listening history storing portion 406 is disposed in association with the content displaying portion 405. A real watching/listening history is periodically or non-periodically transmitted to the delivering apparatus 102 through the communication controlling portion 403 and the bi-directional network 105.

A profile storing portion 408 stores profile information that is input through a profile operating portion 407. Data stored in the content storing portion 404 is selected by the content selecting portion 402 corresponding to profile information. The profile information is periodically or non-periodically transmitted to the delivering apparatus 102 through the communication controlling portion 403 and the bi-directional network 105. The structure of each of the receiving terminal units $103_2$ to $103_n$ may be the same as the structure of the receiving terminal unit $103_1$.

Figure 5:
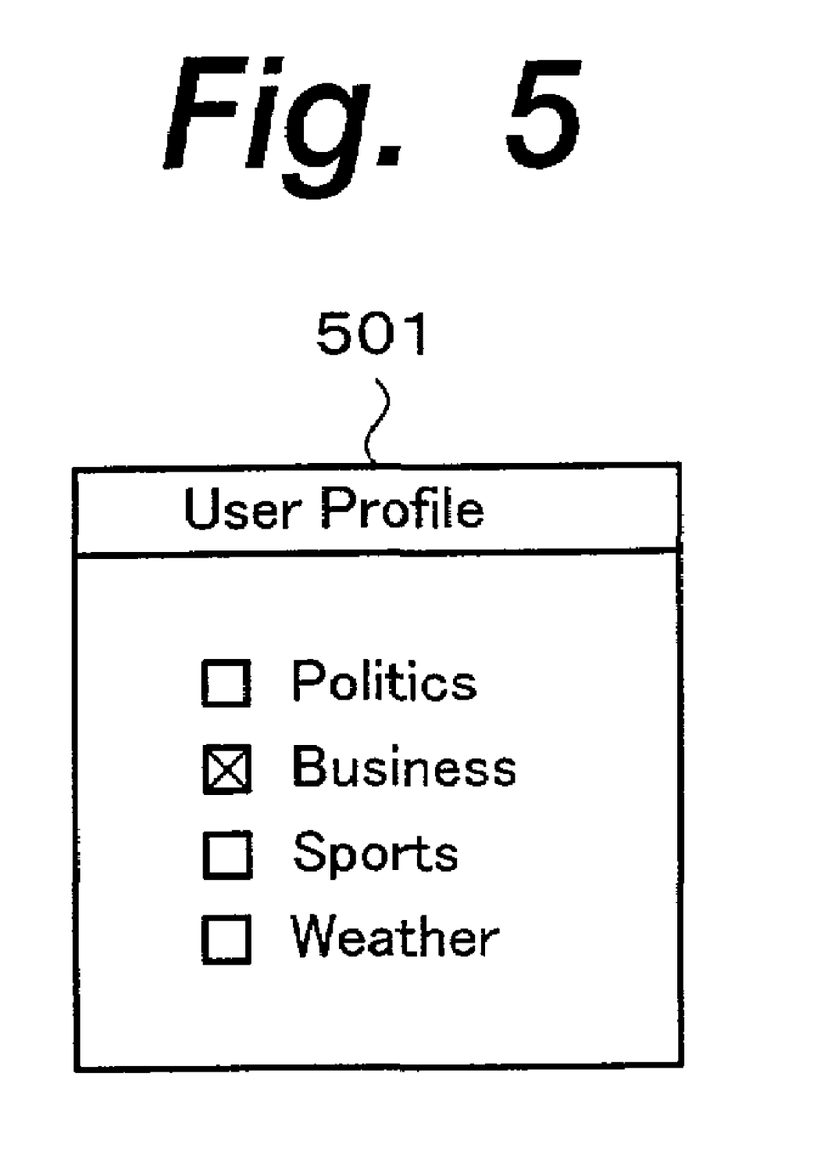
FIG. 5 is a schematic diagram showing an example of the structure of a user profile operating portion.

FIG. 5 shows an example of the operation of a profile of the profile operating portion 407. A user profile (for example, preference information) has genres of politics, business, sports, and whether. The user designates his or her profile by checking desired genres on a screen shown in FIG. 5. In FIG. 5, the business genre has been selected.

Figure 6:
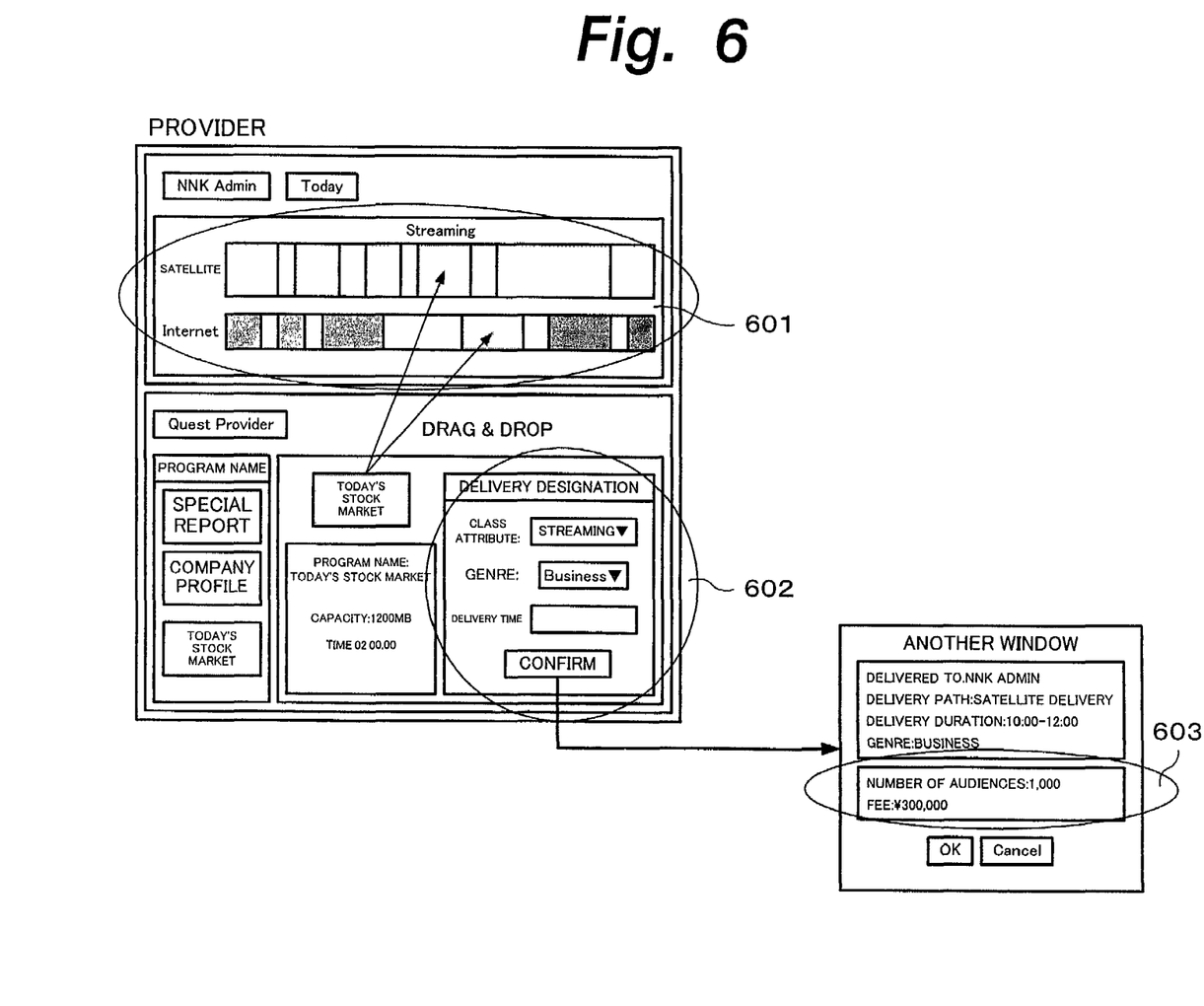
FIG. 6 is a schematic diagram showing an example of a delivery designation screen of the information providing apparatus.

FIG. 6 shows an example of a delivery condition designated by the information providing apparatus $101_1$. The information providing apparatus $101_1$ displays a delivery designation screen. In FIG. 6, an indication 601 displays a band corresponding to one transponder of for example a satellite broadcast and a band assignment state of a bi-directional network (for example, Internet). In the indication 601, the horizontal axis represents time (or month/day), whereas the vertical axis represents a band. In FIG. 6, shaded portions represent portions of which the band is occupied by contents. Such a band assignment state can be obtained as information managed by the band controlling portion 309 of the delivering apparatus 102 through the bi-directional network 105.

In FIG. 6, an indication 602 is a designation indication displayed by the delivery designating portion 203. In the example shown in FIG. 6, a content "today's stock market" is designated. When the label of the content "today's stock market" is dragged and dropped to a blank area of the indication 601, a medium for delivering the content and the delivery time can be reserved. After the label has been dragged and dropped, the delivery time is displayed in the designation indication 602. When the length of the frame of the delivery time is dragged, the delivery time can be adjusted.

After the delivery for the content has been reserved, a "confirm" button in the designation indication 602 is pressed (clicked). Thus, the information providing apparatus $101_1$ is communicated with the content inputting portion 302 of the delivering apparatus 102. The content inputting portion 302 inquires the charging process controlling portion 305 for a charging state corresponding to the designated delivery condition.

The charging process controlling portion 305 calculates the number of delivery audiences for a content corresponding to information stored in the profile storing portion 306 and/or the watching/listening history storing portion 307. The calculated result as the number of audiences and the charging information corresponding to the designated delivery condition is transmitted to the information providing apparatus $101_1$.

Thus, an indication 603 for the number of audiences and charging information corresponding to the designated delivery condition is displayed as another window. When the delivery condition displayed in the indication 603 is checked and confirmed, an "OK" button is pressed (clicked). Thus, the delivery condition and charging condition displayed in the indication 603 are confirmed.

Thereafter, a relevant content (in this example, "today's stock market") is transmitted from the information providing apparatus $101_1$ to the delivering apparatus 102. The content is stored to the content storing portion 303 of the delivering apparatus 102. Corresponding to the designated delivery condition, the content is delivered. In other words, the content is delivered using the designated medium at the designated time.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, in the above-described embodiment, both content data and data for managing a content (program information, resource reservation information, and so forth) are handled by a transmitting device or a content providing apparatus. However, only data for managing a content may be handled according to the present invention. Content data may be stored at another location. In addition, when a band is assigned, unlike with the indication 602 of which a band assignment state is displayed by the information providing apparatus and designated by the information provider, a transmission path may be automatically selected. In this case, the number of audiences is calculated corresponding to information stored in the file storing portion or the watching/listening history storing portion. For a content that is delivered to many audiences, a large band is assigned. When a content is delivered to many audiences, a multicast network is used. In contrast, when a content is delivered to not many audiences, a bi-directional network is used.

According to the present invention, a delivery condition (a band and so forth) of a content can be designated corresponding to user profile information and/or watching/listening history information. Thus, in the environment of which delivery resources are shared by a plurality of information providers, they can be effectively used. In addition, according to the present invention, a charging condition is calculated. Thus, a delivery cost can be presented to information providers. As a result, the information providers can designate delivery conditions in consideration of the delivery cost.

What is claimed is:

1. An information providing apparatus for delivery of content data, comprising:
   content data input means for operation by a user to input content data;
   storing means for storing the content data provided by the content data input means;
   delivery designating means for designating a delivery condition including one of a transmission band and a transmission medium to be used for delivering the content data stored in the storage means; and
   a communication control unit for receiving indication data corresponding to the delivery condition to be designated by the delivery designating means from a delivery apparatus and supplying the received indication data to the delivery designating means for use in designating the delivery condition, including one of the transmission band and the transmission medium,
   wherein the indication data includes a number of delivery audiences of the content data that is calculated based on information stored in profile data and/or watching/listening history data, and a calculated cost corresponding to the delivery of the content data; and
   wherein the indication data correspond to the delivery condition.

2. The information providing apparatus as set forth in claim 1,
   wherein the data for use in designating the delivery condition is a delivery cost.

3. An information providing method for delivery of content data, comprising the steps of:
   a user inputting operation for inputting content data to be delivered;
   storing the content data provided in the user inputting operation; and
   designating a delivery condition set by the user including one of transmission band and a transmission medium to be used in delivering the content data;
   wherein before the delivery condition is designated, receiving indication data corresponding to the delivery condition to be designated from a delivery apparatus and using the received delivery indication data in the step of designating a delivery condition,
   wherein the indication data includes a number of delivery audiences of the content data that is calculated based on information stored in profile data and/or watching/listening history data, and a calculated cost corresponding to the delivery of the content data; and
   wherein the indication data correspond to the delivery condition.

4. A delivering apparatus for delivering content data, comprising:
   first communicating means for receiving from an information provider content data including a delivery condition including one of a transmission band and a transmission medium set by the information provider;
   storing means for storing the content data;
   transmitting means for delivering the content data to a receiving terminal unit;
   second communicating means for receiving user profile information from the receiving terminal unit over a bi-directional network;
   profile storing means for storing the user profile information received by said second communication means;
   charging process controlling means for calculating a cost corresponding to the delivery of the content data according to the received delivery condition; and
   band controlling means for controlling a band used for delivering the content data based on the delivery condition set by the information provider;
   wherein the charging process controlling means pre-calculates a number of delivery audiences for the content data based on the user information stored in the profile storing means, calculates the cost corresponding to the delivery of the content data, and informs the information provider of the cost corresponding to the received delivery condition.

5. A delivering apparatus for delivering content data, comprising:
   first communicating means for receiving from an information provider the content data including a delivery condition including one of a transmission band and a transmission medium set by the information provider;
   storing means for storing the content data;
   transmitting means for delivering the content to a receiving terminal unit;
   second communicating means for receiving a user watching/listening history from the receiving terminal unit over a bi-directional network;
   watching/listening history storing means for storing the user watching/listening history received by the second communicating means;
   charging process controlling means for calculating a cost corresponding to the delivery of the content data according to the received delivery condition; and
   band controlling means for controlling a band of a network used for delivering the content data based on delivery condition set by the information provider;
   wherein the charging process controlling means pre-calculates a number of delivery audiences for the content data based on the watching/listening history stored in the watching/listening history storing means, calculates the cost corresponding to the delivery of the content data, and informs the information provider of the cost corresponding to the received delivery condition.

6. A delivering method for delivering content data, comprising the steps of:
   receiving from an information provider the content data including a delivery condition including one of a transmission band and a transmission medium set by the information provider;
   storing the content data;
   delivering the content data to a receiving terminal unit;
   receiving user profile information from the receiving terminal unit over a bi-directional network;
   storing the user profile information received in the step of receiving;
   calculating a cost corresponding to the delivery of the content data in accordance with the delivery condition set by the information provider; and
   controlling a band of a network used for delivering the content data based on the delivery condition set by the information provider,
   wherein a number of delivery audiences for the content data is pre-calculated based on the user profile information stored in the step of storing the user profile information,
   the cost corresponding to the delivery of the content data is calculated, and
   the information providing apparatus is informed of the cost corresponding to said delivery condition.

7. A delivering method for delivering content data, comprising the steps of:

receiving from an information provider the content data including a delivery condition including one of a transmission band and a transmission medium set by the information provider;

storing the content data;

delivering the content data to a receiving terminal unit;

receiving a user watching/listening history from the receiving terminal unit over a bi-directional network;

storing the watching/listening history received in the step of receiving a user watching/listening history;

calculating a cost corresponding to the delivery of the content data in accordance with the delivery condition set by the information provider; and controlling a band of a network used for delivering the content data in accordance with the delivery condition set by the information provider, wherein a number of delivery audiences for the content data is pre-calculated based on the watching/listening history stored in the step of storing the user watching/listening history, the cost corresponding to the delivery of the content data is calculated, and the information provider is informed of the cost corresponding to said delivery condition.

* * * * *